United States Patent [19]

Knecht et al.

[11] Patent Number: 5,421,928

[45] Date of Patent: Jun. 6, 1995

[54] LASER REMOVAL OF EXCESS OPTICAL FIBER PRIOR TO CONNECTOR POLISHING

[75] Inventors: Dennis M. Knecht; James P. Luther, both of Hickory, N.C.

[73] Assignee: Siecor Corporation, Hickory, N.C.

[21] Appl. No.: 269,503

[22] Filed: Jul. 1, 1994

[51] Int. Cl.[6] .............................................. B32B 31/00
[52] U.S. Cl. ................................... 156/153; 156/267; 156/272.8; 156/293
[58] Field of Search ............ 156/293, 267, 153, 272.8

[56] References Cited

U.S. PATENT DOCUMENTS

| | | |
|---|---|---|
| 4,272,926 | 6/1981 | Tamulevich . |
| 4,510,005 | 4/1985 | Nijman .................. 156/272.8 |
| 4,905,415 | 3/1990 | Moulin . |
| 4,932,989 | 6/1990 | Presby . |
| 5,007,209 | 4/1991 | Saito et al. . |
| 5,226,101 | 7/1993 | Szentesi et al. .................. 385/85 |

OTHER PUBLICATIONS

"Sculpted optical silica fiber tips for use in Nd:YAG contact tip laser surgery" Optical Engineering vol. 31, No. 7, p. 1404 (Jul. 1992).
"Laser Micromachining of efficient fiber microlenses" Applied Optics vol. 29, No. 18 (Jun. 1990).
"UV laser ablation depends on defects" (unknown).

*Primary Examiner*—Chester T. Barry
*Attorney, Agent, or Firm*—J. David Abernethy

[57] ABSTRACT

A method of preparing for polishing the end face of a fiber optic connector having an optical fiber held by a ferrule. A laser beam removes the portion of the optical fiber tip projecting beyond a predetermined distance. The beam has a spot size selected so as to also remove excess epoxy.

3 Claims, 1 Drawing Sheet

LASER REMOVAL OF EXCESS OPTICAL FIBER PRIOR TO CONNECTOR POLISHING

BACKGROUND OF THE INVENTION

Various grinding and polishing machines have been proposed to prepare connectors having a desired end face surface. Examples are shown in Saito et al., U.S. Pat. No. 5,007,209; Moulin, U.S. Pat. No. 4,905,415, and others. A coupler end face having an optical fiber distal end projecting from a surrounding ferrule is ground, normally on a pad of some sort. A time-consuming preparatory step involves preparation of the projecting fiber tip. If the tip is too short, it may not be polishable; if too long, it can perforate the grinding pad.

The optical fiber distal ends are often secured in their ferrules by an adhesive such as epoxy. In practice, excess epoxy must also be ground off, increasing the time necessary for the grinding process. A fast and accurate method for preparing the coupler end faces would be an improvement in the art.

SUMMARY OF THE INVENTION

The method according to the invention begins with providing an optical fiber secured in a ferrule. The distal end of the optical fiber extends more than a predetermined distance from the ferrule end face. A laser beam from an angle of at least forty-five degrees from the principal axis of the optical fiber is focused on the optical fiber distal end to remove excess optical fiber and adhesive, thereby leaving a substantially flat surface on the optical fiber end face at the predetermined distance. The coupler end face is thereafter mechanically polished by a prior art method such as a grinding machine.

The value of the predetermined distance may be selected to be in the range between 0.0 and 1.0 mm.

BRIEF DESCRIPTION OF THE DRAWINGS

The preferred embodiment of the invention is described with reference to the drawings, in which.

DETAILED DESCRIPTION OF THE PREFERRED EMBODIMENT

Figure 1:
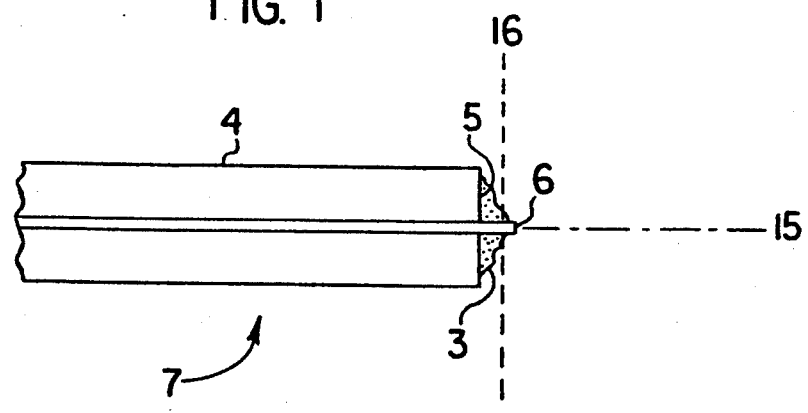
FIG. 1 is a side elevation of an optical fiber secured by an adhesive in a ferrule.

In FIG. 1, an optical fiber distal end 6 having a principal axis 15 extends more than a predetermined distance 16 of 0.25 mm from the end face 5 of ferrule 4. Excess epoxy 3 used to secure optical fiber 6 in ferrule 4 is present on ferrule end face 5. Reference numeral 7 denotes the unit shown in FIG. 1.

Figure 2:
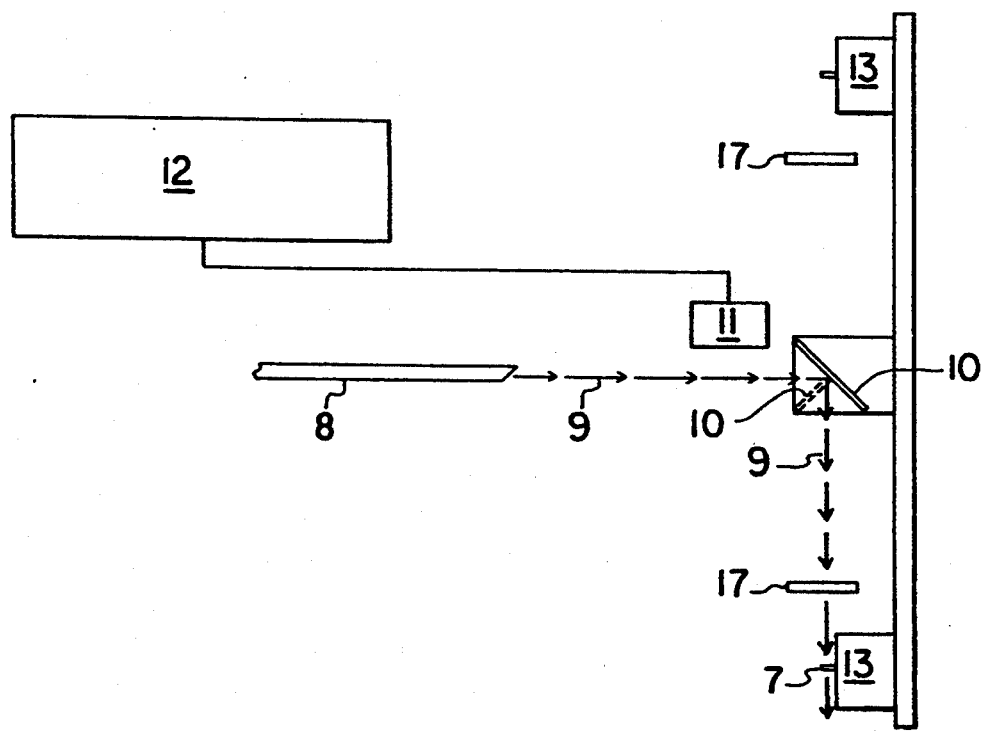
FIG. 2 is a schematic view of the laser apparatus.

An automated dual-port system for practicing the invention is shown in FIG. 2. A single port system or other multiple port systems may be used as desired. A laser tube 8 emits a pulsed laser beam 9, which then reflects off one of the two right angled mirrors 10 through a Ge meniscus lens 17. Motor 11, controlled from computer console 12, moves the mirror to be used to an elevation level with laser beam 9, while the unused mirror is lowered to a secondary position. Ports 13 each hold units 7. Laser beam 9 is reflected onto an optical fiber distal end 6 at an angle of at least forty-five degrees from principal axis 15 to remove excess optical fiber and epoxy and leave a substantially flat optical fiber end surface at a predetermined distance from the end face 5 of ferrule 4. Laser beam 9 is focused by lens 17 to have a spot size (diameter of focus) in the range between 0.1 and 0.5 mm. After the laser operation is complete, unit 7 is removed and then mechanically polished. The complete process is efficient and effective in producing finished units of high quality.

The end of the laser tube 8 nearest the mirrors 10 is at a first potential and the end more distant from mirrors 10 is at a higher potential. An interlock system is desirable to prevent the laser from firing at any time other than when a mirror and a unit 7 to be treated are in proper position.

Laser beam 9 is reflected so as to be near perpendicular to principal axis 15 if a perpendicular end face is desired. The angle from perpendicular axis 15 may be around 45 degrees to 80 degrees if an angled cut is desired. As laser beam 9 is slightly conical due to its focal length, some angle in the fiber end face is a normal result.

What is claimed is:

1. A method of preparing for polishing the end face of a fiber optic coupler having an optical fiber held by a ferrule, comprising securing in the ferrule a length of optical fiber having a principal axis such that a distal end of the optical fiber extends more than a predetermined distance from a ferrule end face, removing such distal end by focusing a laser beam on such distal end from an angle of at least forty-five degrees from the principal axis of the optical fiber to leave a flat optical fiber end surface, and thereafter mechanically polishing the fiber optic coupler.

2. A method as recited in claim 1 wherein the predetermined distance is in the range between 0.0 and 1.0 mm.

3. A method as recited in claim 1 wherein the optical fiber is secured in the ferrule by use of an adhesive, and the laser beam is focused by a lens to have a spot size in the range between 0.1 and 0.5 mm in order to vaporize any excess adhesive.

* * * * *